3,007,970
PREPARATION OF SODIUM HYDROCARBON BORON COMPOUNDS
Eugene C. Ashby, Baton Rouge, La., assignor to Ethyl Corporation, New York, N.Y., a corporation of Delaware
No Drawing. Filed Dec. 29, 1958, Ser. No. 783,074
5 Claims. (Cl. 260—606.5)

This invention is concerned with the preparation of metal organoboron compounds, particularly sodium organoboron compounds having at least one ethyl or methyl group.

It has been known that alkali metal organoboron compounds can be prepared by reacting certain organoalkali metal compounds with organoboranes. For example, lithium tetraphenylboron has been obtained by reacting phenyllithium with triphenylborane. This procedure is the only prior art method known for preparing such complex alkali metal organoboron compounds. An inherent disadvantage is that the organoalkali metal compound employed is difficult to prepare. This is especially true when an attempt is made to produce the organosodium compounds. Certain organosodium compounds are relatively easily prepared by reacting sodium or an alloy thereof, which further activates the sodium, with an organic halide. However, this procedure is not readily applicable to producing ethyl- or methylsodium. For producing these materials, the prior art has had to resort to the reaction of diethyl or dimethyl mercury with sodium which is also quite difficult and does not readily provide a pure product. As far as now known, no one has been able to prepare ethyl- or methylsodium by the simple reaction of ethyl chloride or methyl chloride with metallic sodium. For this and other reasons, the formation of sodium organoboron compounds by reacting ethyl- or methylsodium with an organoboron compound according to the prior art procedure has not been explored.

An object of this invention is to provide a novel process for the manufacture of sodium organoboron compounds. A particular object is to provide an improved and new procedure for producing sodium organoboron compounds wherein at least one of the organo groups is an ethyl or methyl group. A specific object of this invention is to provide a novel process for the manufacture of sodium tetraethylboron. These and other objects will be evident as the discussion proceeds.

It has now been discovered that one need not preprepare an ethyl- or methylsodium compound in order to react it with an organoboron compound to produce a sodium organoboron compound. The discovery has been made that one can react an alkyl chloride having less than three carbon atoms in the alkyl group with sodium and an organoboron compound to result in the corresponding sodium organoboron compound. The reaction can be conducted over a wide range of temperatures as between about −50 to 250° C., although best results are obtained at about −10 to 50° C. Pressure is not required but can be employed to advantage when desirable to keep the volatile reactants liquid under the reaction conditions. Ethyl chloride is a preferred alkyl chloride and boron compounds having only organo substituents attached thereto, especially alkyl or aryl radicals having up to about 8 carbon atoms, are preferred. A particular embodiment of this invention is the reaction of ethyl chloride with sodium, preferably finely divided, and triethylborane at between about −10 to 50° C. to produce sodium tetraethylboron. Organic solvents can be used to some advantage, even though some may complex with the product produced, in order to provide a more fluid reaction system.

Thus, by the process of this invention as briefly described above, one need not employ the tedious and complicated techniques for preparing ethyl- or methylsodium and then reacting this material with the organoborane compound. Despite the fact that metallic sodium will not react with ethyl or methyl chloride, the reaction of the present invention proceeds quite rapidly, although the mechanism by which the reaction takes place is not understood. Other advantages of the process of this invention will be evident as the discussion proceeds.

The sodium metal which is employed is readily available as a commercial product and can be employed in this form. Better results are, however, obtained when the metal is employed in a finely divided form, for example, below about 1000 microns in major diameter. Such forms of sodium are well known and readily obtainable by heating the sodium above its melting point in an essentially organic inert diluent, vigorously agitating the mixture, and then cooling to below the melting point. The well known sodium dispersions are also quite applicable wherein the average particle size of the sodium is reduced to below about 50 microns and preferably below about 20 microns. The solvents which are employable in preparing such dispersions can be those described hereinafter which are essentially inert to the sodium and uses to which it is employed. If desired, the dispersion medium can be removed by distillation, filtration or other techniques prior to employment in the present process although such is not required.

As described above, ethyl or methyl chloride are the alkyl chlorides employed in the process of this invention.

In general, any boron compound having at least one organic radical bonded to boron through a carbon atom and wherein the other valences of the boron are satisfied by such organic radicals or hydrogen can be employed. Typical examples of such compounds include alkyl, alkenyl, cycloalkyl, cycloalkenyl, and aryl boron compounds as, for example, trimethylborane, triethylborane, trihexylborane, trioctylborane, tricyclopentylborane, tricyclohexylborane, trimethylcyclohexylborane, diethylboron hydride, dimethyl-diborane, triethylborane-triethylamine complex, trioctylborane-triethylamine complex, octyldiethylborane, trivinylborane, tricyclohexenylborane, triphenylborane, tribenzylborane, diphenylboron hydride, trinaphthylborane, methyldiphenylborane and the like. In general, such compounds will have up to and including about 20 carbon atoms in each hydrocarbon group. It is to be understood that such hydrocarbon groups can be further substituted provided that such substituents are essentially inert in the reaction. It is preferable that trialkyl boranes wherein the alkyl hydrocarbon groups contain up to about six carbon atoms be employed because of their greater availability and applicability in the process. Triethylborane is an especially preferred embodiment of the organoboron compound employed.

Some advantage is achieved when the reaction is conducted in the further presence of a liquid organic diluent. Such diluents are preferably essentially inert in the reaction with exception that those that will complex with the product or reactants can be employed since they will not hinder the desired result. Further criteria of such solvents are that they be liquid under the reaction conditions. Among the solvents which can be employed are included, for example, the hydrocarbons, ethers and amines. Among the hydrocarbons which can be employed are included the various alkanes, alkenes, cyclanes, cyclenes and aromatic compounds, including the mononuclear aromatic compounds, polynuclear non-fused ring and polynuclear fused ring aromatic compounds. Typical examples of the alkanes which are employed include heptane, octane, nonane, up to and including about octadecane and the like, and their various branched chain isomers. Among the alkenes are included, for example, heptylene, octylene, and the like, up to and including about octadecylene and their various branched chain isomers. When the cyclanes are employed as diluents, they can be, for example, cycloheptane, cyclooctane, methylcyclohexane, dimethylcyclohexane, is propylcyclopentane, and the like. Typical examples of the cyclenes include cycloheptene, cyclooctene, 1 - isopropylcyclopentene - 1, 1 - methylcyclohexene - 1, and the like. Similarly, various polycyclanes and cyclenes are employed as for example, cyclopentylcyclopentane; (2-methylcyclopentyl)-cyclohexane; cyclohexylcyclohexane; decahydronaphthalene; 1,1'-dicyclopentenyl; 2,2'-dicyclohexenyl; decahydrofluorene; and the like. Typical examples of mononuclear aromatic compounds include toluene, ethylbenzene, the xylenes, 1,2-diethylbenzene, cyclopropylbenzene, the cymenes, and the like. When the diluents are polynuclear non-fused aromatic compounds, they can be, for example, 1-methyl-2-phenylbenzene; 1,3-diphenylpropane; 1-phenyl-2-p-tolylethane; 1,1-diphenylheptane; and the like. When polynuclear fused ring aromatic compounds are employed they can be, for example, indane; 1-methylindane; indene; tetralin; 1,2-dihydronaphthalene; 1-methylnaphthalene; and the like. Mixtures are also employable, as for example, gasoline, mineral oil, and the like. Generally speaking, the ethers can be non-aromatic, aromatic and polyethers. The non-aromatic ethers include the monoaliphatic and mixed ethers. Typical examples of the monoaliphatic ethers which are employed are di-n-butyl ether; di-sec-butyl ether; disobutyl ether; di-n-amyl ether; di-n-heptyl ether; and the like saturated and unsaturated ethers. Examples of the mixed ethers which are employed are n - amylmethyl ether; tert - amylethyl ether; n-butylisopropyl ether; ethylisoamyl ether; n - butyl - n - propyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, one can employ, for example, methylphenyl ether; methyl-o,m, or p-tolyl ether; methyl-α-naphthyl ether; ethylphenyl ether; ethyl-o,m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers which can be employed are, for example, benzylmethyl ether; benzylethyl ether; benzyl-n-butyl ether; and the like. Examples of the polyethers which are employed are those having the configuration R—O—(CH$_2$)$_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene; and the like. Included among the amines are the primary, secondary, tertiary and heterocyclic amines as for example, ethyl amine, propyl amine, diethyl amine, dipropyl amine, dicyclohexyl amine, diphenyl amine, triphenyl amine, triethyl amine, myristyl diethyl amine, pyridine, cyclohexylamine, ethanolamine, aniline, tribenzyl amine, trivinyl amine, and the like. In general, the hydrocarbon portions of such diluents will have up to about 20 carbon atoms. Such solvents can of course contain other substituents which are essentially non-reactive in the system and will not hinder the principal reaction desired. Best results are obtained when saturated or aromatic type solvents are employed as contrasted to those solvents having olefinic functions. The ethers comprise especially preferred reaction media, particularly the saturated polyethers, since higher yields are obtained when such are employed. Likewise, the ethers more readily complex with metal organoboron compounds and such are more readily adaptable to further use than the uncomplexed metal organoboron compounds. Of the ethers the dialkyl ethers of ethylene and diethylene glycol wherein the alkyl groups contain up to about six carbon atoms are particularly preferred. Among such ethers, the dimethyl ether of diethylene glycol and the dimethyl ether of ethylene glycol are particularly advantageous.

The proportion of the reactants employed in conducting the process of this invention are subject to considerable latitude. In order to obtain the highest yields of the sodium organoboron compound, it is preferable to employ at least one mole of the ethyl or methyl chloride and at least two moles of sodium per mole of the organoboron compound. In general, not more than 1½ moles of the ethyl or methyl chloride and 2½ moles of the sodium per mole of the organoboron compound are required. In order to eliminate the presence of free sodium at the completion of the reaction, one can employ a slight deficiency of this reactant, as for example, about 1.95 to 2 moles of the sodium per mole of the organoboron compound.

The amount of solvent which is employed is usually such to provide a fluid reaction system along with some heat control. For this purpose between about 1 to 100 parts of the solvent per part of the organoboron compound are adequate but best results are obtained when between about 10 to 50 parts of solvent per part of organoboron compound is employed. In most instances wherein the solvent is an electron donating material, such as the ethers and the amines, which would complex with the product, it is preferable to employ at least one mole of such a solvent per mole of organoboron compound in order to result in such a complex which is more stable, easier to handle, and exhibits greater solubility than does the uncomplexed sodium organoboron compound.

Although different sequences of addition of the reactants are possible, it is preferable that the organoboron reactant be initially present. A preferred operation is to add either the sodium or the ethyl or methyl chloride to the organoboron compound and the other reactant in order to minimize possible side reactions.

The process of this invention will be more completely understood from a consideration of the following examples wherein all parts are by weight unless otherwise specified.

*Example I*

To a reactor equipped with internal agitation, a Dry Ice reflux condenser, a means for maintaining an inert atmosphere and means for adding reactants were added 4.6 parts of sodium sand, prepared by agitating sodium metal in "Bayol–D" above the melting point of sodium with agitation and cooling and then filtering the sand from the "Bayol–D." Then 175 parts of diethyl ether were added to the flask and 10 parts of triethylborane were added followed by dropwise addition of 6.5 parts of ethyl chloride. The entire reaction system was maintained at room temperature while continuing agitation for a period of 3 hours. A purple and white solid settled to the bottom of the reactor. The ether layer was filtered therefrom and the filtrate evaporated at 1 millimeter of mercury pressure and 25° C. White crystalline solid remained which was dried at 100° C. for 2 hours leaving 10.5 parts or 70 percent of the theoretical of product. A sample of the product was treated with dilute hydrochloric acid whereby triethylborane was liberated. Analysis of the product showed 17.3 percent sodium whereas sodium tetraethylboron contains 15.3 percent sodium. The solid product was redissolved in diethyl ether and again filtered and the ether filtrate was evaporated. The crystals which formed were dried at reduced pressure at 80–100° C. for 4 hours. Analysis of the product indicated 15.2 percent sodium as compared to 15.3 percent sodium in sodium tetraethylboron.

*Example II*

Employing the apparatus of Example I, 46 parts of sodium sand were added to a stirred mixture of 98 parts triethylborane 64.5 parts ethyl chloride and 280 parts of diethyl ether at 4° C. over a period of 3 hours. The mixture was allowed to warm to room temperature and the excess ethyl chloride was permitted to evaporate. The solids of the reaction were filtered and washed with ether. The combined filtrates and ether solution of the reaction mixture were diluted with hexane and cooled to crystallize sodium tetraethylboron etherate. A total of 168 parts of the etherate were obtained representing a yield of 75 percent. This product was then refluxed in hexane and dried in vacuum in order to remove the ether therefrom. Upon analysis, 15.4 percent sodium was found whereas sodium tetraethylboron contains 15.3 percent sodium.

*Example III*

Employing the procedure of Example II sodium tetramethylboron is obtained in high yield when methyl chloride is substituted for ethyl chloride and trimethylborane is substituted for triethylborane.

It is not necessary to recover the product from the reaction system as demonstrated in the above examples. If desired, the mixture can be further diluted with a suitable solvent such as an ether to dissolve all of the product and then the solids can be filtered and excess ethyl or methyl chloride evaporated from the system. Likewise, the reaction mixture may only be treated for removal of the ethyl or methyl chloride by evaporation and then employing the residue which is obtained on filtering the solids from the reaction mixture. The by-product, sodium chloride, is not deleterious to most other uses of the sodium organoboron compound produced.

*Example IV*

When Example II is repeated substituting methyl chloride for ethyl chloride, sodium methyltriethylboron is obtained in high yield.

*Example V*

When Example II is repeated employing triphenylborane in place of triethylborane with the reaction temperature at 150° C. employing the dimethyl ether of diethylene glycol as a solvent and sufficient pressure to maintain the ethyl chloride fluid, the dimethyl ether of diethylene glycol etherate of sodium ethyl triphenylboron is obtained.

*Example VI*

When tricyclohexylborane is substituted for triphenylborane and the diethyl ether of ethylene glycol is substituted for the dimethyl ether of diethylene glycol in the above example, the di-diethyl ether of ethylene glycol etherate of sodium ethyltricyclohexylboron is produced in high yield.

*Example VII*

Substituting trivinylborane for triethylborane in Example II, sodium ethyltrivinylboron is obtained in high yield.

*Example VIII*

Sodium tetraethylboron complexed with triethylamine is obtained in high yield when triethylamine is substituted for diethyl ether in Example II.

*Example IX*

The procedure of Example I is repeated with the exception that a 50 percent dispersion of finely divided sodium of average particle size of 10 microns in toluene is employed in place of the sodium sand-diethyl ether mixture, sodium tetraethylboron is obtained in essentially quantitative yield.

*Example X*

When diethylborohydride is reacted with a 25 percent dspersion of sodium of particle size averaging 15 microns in mixed nonanes at 50° C. with ethyl chloride for 3 hours, sodium triethylborohydride is obtained in high yield.

When tributylborane, tribenzylborane, dipropylborohydride, tricyclopentylborane and similar such organoboron compounds are substituted in the above examples, equally satisfactory production of the corresponding sodium ethyl or methyl organoboron or organoboronhydrides are obtained. Likewise when mixed hexanes, mineral oil, cyclohexane, xylene and the like hydrocarbons are substituted as diluents, equally saisfactory results are obtained. Furthermore, one can substitute diphenylether, tetrahydrofuran, dioxane, diamylether, trimethylamine, diethylamine, aniline, pyridine, cyclohexylamine and the like ethers and amines in the above examples to produce the corresponding complexes of the indicated sodium ethyl or methyl organoboron or organoborohydrides compounds.

The products produced according to the process of this invention are of considerable utility. For example, they can be employed as reducing agents to reduce organic functions such as acid, ketone or alcohol functions. They are likewise useful as alkylating or arylating agents. A typical example of this use is that wherein sodium tetraethylboron is reacted with a lead salt such as lead chloride or a lead salt of an organic acid to produce tetraethyllead. Other uses of the products produced according to this invention will be evident to those skilled in the art.

Having thus described the present invention, it is not intended that it be limited except as set forth in the following claims.

I claim:

1. The process for the manufacture of sodium hydrocarbon boron compounds which comprises reacting sodium metal with a compound selected from the group consisting of ethyl chloride and methyl chloride and a hydrocarbon boron compound containing at least one hydrocarbon group selected from the group consisting of alkyl, alkenyl, cycloalkyl, cycloalkenyl, and aryl groups attached to boron and the remaining valencies of the boron are satisfied by a group selected from hydrogen and alkyl, alkenyl, cycloalkyl, cycloalkenyl, and aryl groups.

2. The process of claim 1 wherein the reaction is conducted in the presence of an essentially inert organic solvent at a temperature between about −50 to 250° C.

3. A process for the manufacture of sodium tetraethylboron which comprises reacting ethyl chloride with sodium and triethylborane at between about −10 to 50° C.

4. The process of claim 1 wherein said hydrocarbon boron compound is a trialkylborane wherein the alkyl groups contain up to about 8 carbon atoms.

5. The process of claim 3 further characterized in that the reaction is conducted in the presence of diethyl ether as a solvent.

References Cited in the file of this patent

UNITED STATES PATENTS 2,880,242    Hennion _____ Mar. 31, 1959